A. N. PASMAN.
FLUSH VALVE.
APPLICATION FILED AUG. 5, 1910.

1,035,898.

Patented Aug. 20, 1912.

Witnesses:

Inventor:
Abram N. Pasman,
By Harold Serrell
His Attorney.

UNITED STATES PATENT OFFICE.

ABRAM N. PASMAN, OF JERSEY CITY, NEW JERSEY, ASSIGNOR TO WILLIAM H. BONYNGE, OF JERSEY CITY, NEW JERSEY.

FLUSH-VALVE.

1,035,898.  Specification of Letters Patent.  Patented Aug. 20, 1912.

Application filed August 5, 1910. Serial No. 575,786.

*To all whom it may concern:*

Be it known that I, ABRAM N. PASMAN, a citizen of the United States, residing in Jersey City, county of Hudson, and State of New Jersey, have invented an Improvement in Flush-Valves, of which the following is a specification.

My invention relates to flush valves such as are used as faucets, in closets, urinals and similar places, in which a predetermined flow of water is required at desired times.

The valve made in accordance with my present invention, is an improvement on the flush valves shown and described in Letters Patent Nos. 789561 and 956158, granted to me respectively on May 9th, 1905, and April 26th, 1910, and the object of my present invention is to simplify the valve structure in order to reduce the cost of manufacturing the same.

In the flush valve shown and described in the Letters Patent hereinbefore named, both a piston valve and an independent inlet valve were employed in spaced apart positions and the structure was such that to operate properly, it was necessary that both of these valves be made to seat simultaneously. This required not only accurate machine work, but also perfect adjustment in order that the proper operation of the apparatus might be obtained, whereas in my present invention, the apparatus comprises but a single valve which performs the functions of both the valves in the structures illustrated and described in the aforesaid Letters Patent, as will be hereinafter more particularly described.

Figure 1:
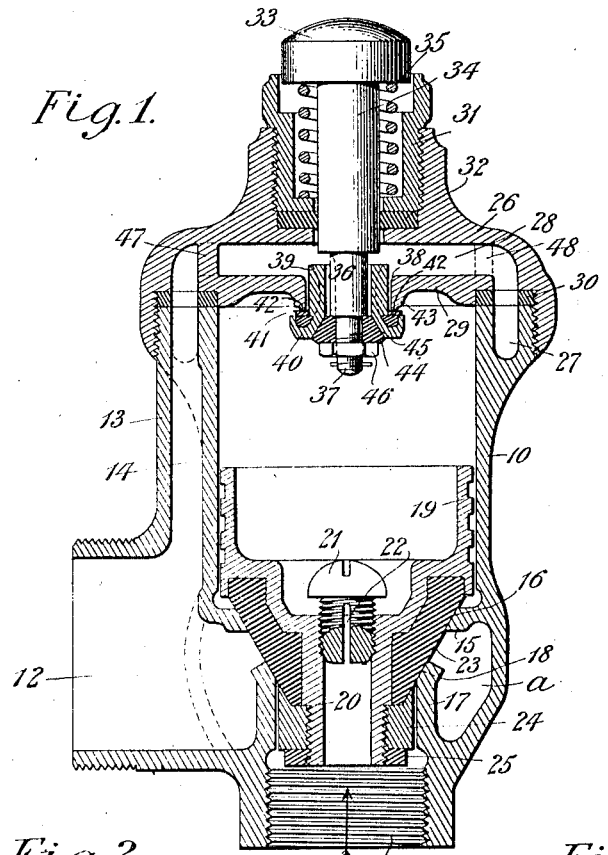
Figure 2:
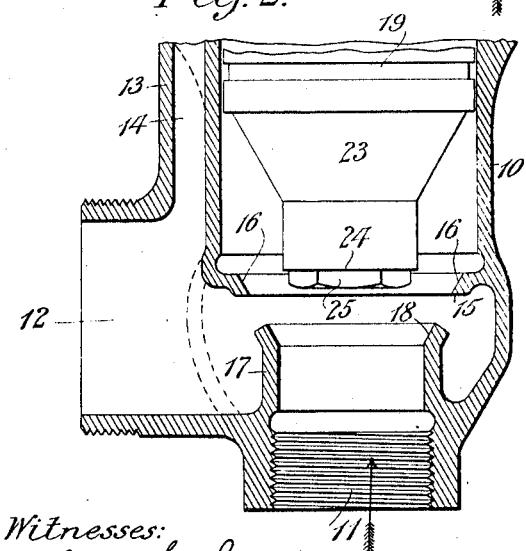
Figure 3:
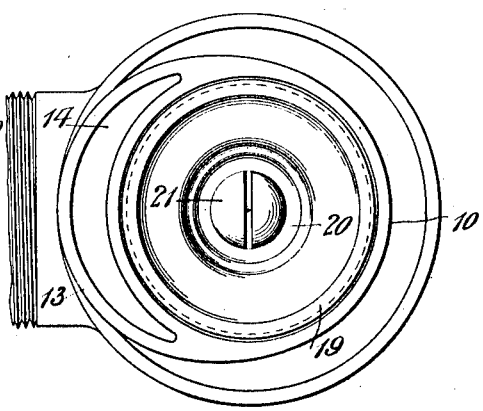

In the drawing, Figure 1 is a central longitudinal cross section of a flush valve illustrating my present invention. Fig. 2 is a similar view showing the lower portion of the apparatus with the piston raised and the valve in an unseated position, and Fig. 3 is a plan view of the apparatus with the cap thereof removed.

Referring to the drawing, the flush valve comprising my present invention, preferably consists of a cylindrical casing 10 having an inlet connection 11 at the bottom and an outlet connection 12 preferably on the side thereof adjacent to the bottom. On the side of the casing 10 there is also a longitudinal wall 13 providing for a passageway 14 leading from the outlet connection 12, so as to make a communication between the same and the interior of the cylinder. At the lower end of the cylinder proper, there is a bottom member 15 provided with an opening and the sides of the walls defining the opening are tapered as indicated at 16 to provide a valve seat.

Extending upwardly toward the cylinder bottom 15 from the inlet connection 11, there is a circular wall 17, the upper extremity of which is preferably flaring and the inner surface thereof tapered as indicated at 18 to also form a valve seat, the valve seat 16 and the valve seat 18 being tapered at the same angle.

Within the cylinder 10 there is a tubular member 20 in which is provided a regulating screw 21 having angular slots 22 oppositely disposed therein so as to provide for the admission of the water from the inlet connection to the cylindrical chamber above the piston. Surrounding the depending tubular member 20 is a conical valve 23 made of any suitable yielding material adapted when the piston 19 is in its lowermost position, to bear against the valve seats 16 and 18, and this conical valve 23 is secured in position by means of a nut 24 and a lock nut 25, both of which are turned down on the screw threaded extremity of the depending member 20. The exterior of the opposite or upper end of the cylindrical member 10 is screw threaded to receive a cap or hood member 26 and the upper end of the cylindrical member 10 is provided with a circular channel 27 communicating with the chamber 28 in the cap 26, the chamber 28 in the cap 26 being provided for by the wall 29 therein, and between the adjacent surfaces of the cylindrical member 10 and the cap 26, a gasket 30 is employed to insure a tight joint. The cap 26 is provided with a socket 31 between the end of which and the base of the opening provided therefor in the cap 26, a gasket 32 is employed to also insure a tight joint.

33 is a push button secured to a pin 34 passing through the socket 31 and surrounded therein by a spring 35 which as will be understood, tends to normally maintain the push button 33 and the pin 34 in their outer positions. At its inner end the pin 34 is provided with a reduced portion 36 and this reduced portion 36 is still further reduced as indicated at 37, which forms the inner end of the pin 34.

There is an opening 38 placed centrally in the wall 29 and surrounding the reduced portion 36 and extending through the opening 38 there is a sleeve 39. The lower portion of this sleeve 39 is flanged as indicated at 40 and is suitably recessed to receive a valve 41 adapted to bear against the seat 42 formed at the inner extremity of the wall or lip 43 surrounding the opening 38. The valve 44 is secured on the reduced end 37 by the nut 46 or otherwise and this valve 44 is adapted to bear against a seat 45 provided therefor in the sleeve 39.

The push button structure hereinbefore last described for releasing the pressure within the cylindrical member 10 above the piston, is similar to or the equivalent of the like parts shown and described in Letters Patent No. 956158, to which reference has hereinbefore been made.

It will be understood that the wall 29 in the cap 26 is connected to the body portion of the cap by the wall 47 in which at suitable intervals there are openings 48 whereby direct communication is provided between the chamber 28 in the cap 26 and the outlet connection 12 by way of the channel 27 and the passageway 14 provided for by the wall 13.

In the operation of the hereinbefore described flush valve,—upon the push button 33 being depressed, the valve 44 is first unseated, then the valve 41 is unseated, when as will be understood, the pressure in the cylinder above the piston is released, whereby through the action of the water or other liquid under pressure in the inlet connection, the piston 19 will be raised and the valve 23 moved from its seats 16 and 18, the water or other liquid occupying the space above the piston within the cylinder being meanwhile forced through the opening 38 into the chamber 28 and passing by way of the channel 27 and passageway 14 to the outlet connection, and as will be also understood when the piston is raised and the valve 23 unseated, there will be open communication between the inlet 11 and the outlet connection 12. Immediately upon the push button 33 being released, the valves 44 and 41 are reseated through the action of the spring 35 raising the pin 34 and when the water more or less quickly,—depending upon the position of the regulating screw 21,—enters the cylinder 10 and forces the same to its normal position, thereby reseating the valve 23 and preventing the further flow of water to the outlet connection either directly past the valve seat 18 or indirectly through the piston and cylinder past the valve seat 16. It will also be noted that the nut 24 is preferably cylindrical in outline and of slightly less diameter than the bore of the wall 17, so that in reseating the valve 23, the water from the source of supply is gradually cut off, and the desired and so called refill effect is provided for.

I claim as my invention:

1. An automatically closing flush valve comprising a casing having a cylindrical portion and inlet and outlet connections, a bottom to the said cylindrical portion, a tapered valve seat in said bottom, a wall extending inwardly from the said inlet connection into a chamber entirely surrounding said wall and communicating with the outlet connection, a tapered valve seat in the inner end of said wall, a piston, a depending tubular member connected to said piston, a conical valve adapted to bear simultaneously against both the said valve seats, means for securing the said conical valve in position on the depending tubular member, the said means being adapted to pass and fit within the said wall extending inwardly from the inlet connection to gradually shut off the supply of liquid, means for releasing the pressure normally above the piston and regulatable means permitting a flow of liquid through the said piston to move the same to seat the said conical valve.

2. An automatically closing flush valve comprising a casing having a cylindrical portion and inlet and outlet connections, a bottom to the said cylindrical portion, a tapered valve seat in said bottom, a cylindrical wall extending inwardly from the said inlet connection into a chamber entirely surrounding said wall and communicating with the outlet connection, a tapered valve seat in the inner end of said cylindrical wall, a piston, a depending tubular member connected to said piston, a conical valve adapted to bear simultaneously against both the said valve seats, a cylindrical nut on the end of said depending tubular portion for securing the said conical valve in position and for entering the space within the said cylindrical wall extending inwardly from the inlet connection for initially and gradually shutting off the supply of liquid, means for releasing the pressure normally above the piston and regulatable means permitting a flow of liquid through the said piston to move the same to seat the said conical valve.

Signed by me this 8th day of July, 1910.

ABRAM N. PASMAN.

Witnesses:
 Geo. T. Pinckney,
 Bertha M. Allen.